(12) United States Patent
Lee et al.

(10) Patent No.: US 10,629,378 B2
(45) Date of Patent: Apr. 21, 2020

(54) MULTILAYER CAPACITOR

(71) Applicant: SAMSUNG ELECTRO-MECHANICS CO., LTD., Suwon-si, Gyeonggi-do (KR)

(72) Inventors: Jong Pil Lee, Suwon-si (KR); Jin Kyung Joo, Suwon-si (KR); Young Key Kim, Suwon-si (KR); Taek Jung Lee, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/018,767

(22) Filed: Jun. 26, 2018

(65) Prior Publication Data
US 2019/0148068 A1 May 16, 2019

(30) Foreign Application Priority Data
Nov. 10, 2017 (KR) .................. 10-2017-0149825

(51) Int. Cl.
*H01G 4/30* (2006.01)
*H01G 4/232* (2006.01)
(Continued)

(52) U.S. Cl.
CPC .............. *H01G 4/232* (2013.01); *H01G 4/012* (2013.01); *H01G 4/12* (2013.01); *H01G 4/30* (2013.01);
(Continued)

(58) Field of Classification Search
CPC ............ H01G 4/012; H01G 4/12; H01G 4/30; H01G 4/232; H01G 4/008; H01G 4/06; H01G 4/05; H01G 4/248; H01G 4/1227
See application file for complete search history.

(56) References Cited

U.S. PATENT DOCUMENTS 6,327,134 B1 * 12/2001 Kuroda .................. H01G 4/232
361/303
2002/0041006 A1 * 4/2002 Ahiko .................... H01G 4/012
257/532
(Continued)

FOREIGN PATENT DOCUMENTS

JP 2006-100708 A 4/2006
JP 2008-118078 A 5/2008
(Continued)

*Primary Examiner* — Nguyen T Ha
(74) *Attorney, Agent, or Firm* — Morgan, Lewis & Bockius LLP

(57) ABSTRACT

A multilayer capacitor includes: a first internal electrode layer including first and second internal electrodes spaced apart from each other with an insulating portion interposed therebetween; a second internal electrode layer including a third internal electrode; a body including the first and second internal electrode layers alternately disposed with respective dielectric layers interposed therebetween; first and second external electrodes disposed on the body to be electrically connected to the first and second internal electrodes, respectively; a connection electrode penetrating through the body to thereby be electrically connected to the third internal electrode; and a third external electrode disposed on the body to be electrically connected to the connection electrode.

11 Claims, 19 Drawing Sheets

(51) Int. Cl.
*H01G 4/012* (2006.01)
*H01G 4/38* (2006.01)
*H01G 4/12* (2006.01)
*H01G 4/242* (2006.01)

(52) U.S. Cl.
CPC ........... H01G 4/385 (2013.01); *H01G 4/1227* (2013.01); *H01G 4/242* (2013.01)

(56) References Cited

U.S. PATENT DOCUMENTS

| | | | | |
|---|---|---|---|---|
| 2007/0047175 A1* | 3/2007 | Sato | ........................ | H01G 4/012 |
| | | | | 361/303 |
| 2009/0059469 A1* | 3/2009 | Lee | ........................ | H01G 4/012 |
| | | | | 361/306.2 |
| 2015/0041198 A1* | 2/2015 | Lee | ........................ | H01G 2/06 |
| | | | | 174/260 |
| 2015/0109718 A1* | 4/2015 | Choi | ........................ | H01G 2/06 |
| | | | | 361/304 |
| 2015/0124371 A1* | 5/2015 | Park | ........................ | H01G 4/012 |
| | | | | 361/301.4 |
| 2015/0287549 A1* | 10/2015 | Park | ........................ | H01G 2/065 |
| | | | | 361/270 |

FOREIGN PATENT DOCUMENTS

| | | |
|---|---|---|
| JP | 2011-165776 A | 8/2011 |
| KR | 10-2005-0071980 A | 7/2005 |

\* cited by examiner

I - I'

I – I'

I - I'

MULTILAYER CAPACITOR

CROSS-REFERENCE TO RELATED APPLICATION(S)

This application claims the benefit of priority to Korean Patent Application No. 10-2017-0149825, filed on Nov. 10, 2017 in the Korean Intellectual Property Office, the disclosure of which is incorporated herein by reference in its entirety.

BACKGROUND

1. Field

The present disclosure relates to multilayer capacitor.

2. Description of Related Art

Among ceramic electronic components, a multilayer ceramic capacitor (MLCC) has advantages including a small size, high capacitance, and ease of mountability.

The multilayer ceramic capacitor is a chip type condenser mounted on the circuit boards of various electronic products such as display devices including liquid crystal displays (LCDs), plasma display panels (PDPs), and the like, computers, personal digital assistants (PDAs), mobile phones, and the like, and serving to charge or discharge electricity.

The multilayer ceramic capacitor has various sizes and stacking forms depending on uses and capacitance thereof.

Particularly, in accordance with the recent trend toward miniaturization, lightness, and multifunctionality of electronic products, multilayer ceramic capacitors used in electronic products have also been required to have a small size and high capacitance, and to boost voltage.

Therefore, a multilayer ceramic capacitor in which thicknesses of dielectric layers and internal electrodes are thin for microminiaturization of the electronic product and the dielectric layers are stacked in as large a number as possible for super high capacitance of the electronic product has been manufactured.

However, a technology capable of mounting such a micro-sized capacitor in accordance with super-miniaturization of the capacitor is not secured, such that it may be difficult to actually apply such a capacitor to a product.

SUMMARY

An aspect of the present disclosure may provide a multilayer capacitor capable of securing a high degree of freedom in mounting while having a small size and high capacitance.

According to an aspect of the present disclosure, a multilayer capacitor includes: a first internal electrode layer including first and second internal electrodes spaced apart from each other with an insulating portion interposed therebetween; a second internal electrode layer including a third internal electrode; a body including the first and second internal electrode layers alternately disposed with respective dielectric layers interposed therebetween; first and second external electrodes disposed on the body to be electrically connected to the first and second internal electrodes, respectively; a connection electrode penetrating through the body to thereby be electrically connected to the third internal electrode; and a third external electrode disposed on the body to be electrically connected to the connection electrode.

According to another aspect of the present disclosure, a multilayer capacitor includes: a first internal electrode layer including first and second internal electrodes spaced apart from each other with an insulating portion interposed therebetween; a second internal electrode layer including a third internal electrode; a third internal electrode layer including a fourth internal electrode; a body including the first and third internal electrode layers alternately disposed with the second internal electrode layer interposed therebetween, and with respective dielectric layers interposed between each of the first, second and third internal electrode layers; a first external electrode disposed on the body to be electrically connected to the first and fourth internal electrodes; a second external electrode disposed on the body to be electrically connected to the second internal electrode; a connection electrode penetrating through the body to thereby be electrically connected to the third internal electrode; and a third external electrode disposed on the body to be electrically connected to the connection electrode, wherein the fourth internal electrode is stacked so that the fourth internal electrode partially overlaps the first and third internal electrodes but does not overlap the second internal electrode.

According to another aspect of the present disclosure, a multilayer capacitor includes: a first internal electrode layer including first and second internal electrodes spaced apart from each other with a first insulating portion interposed therebetween; a second internal electrode layer including a third internal electrode; a third internal electrode layer including a dummy electrode and a fourth internal electrode spaced apart from each other with a second insulating portion interposed therebetween; a body including the first and third internal electrode layers alternately disposed with the second internal electrode layer interposed therebetween, and with respective dielectric layers interposed between each of the first, second and third internal electrode layers; a first external electrode disposed on the body to be electrically connected to the first internal electrode; a second external electrode disposed on the body to be electrically connected to the second and fourth internal electrodes; a connection electrode penetrating through the body to thereby be electrically connected to the third internal electrode; and a third external electrode disposed on the body to be electrically connected to the connection electrode, wherein the dummy electrode is insulated from the first, second and third external electrodes.

According to another aspect of the present disclosure, a multilayer capacitor includes: a body including dielectric layers and first and second internal electrode layers alternately disposed with respective dielectric layers interposed therebetween; and first, second and third external electrodes disposed on the body. The first internal electrode layer includes first and second internal electrodes spaced apart from each other, the second internal electrode layer including a third internal electrode, the first and second external electrodes are electrically connected to the first and second internal electrodes, respectively, the third external electrode is electrically connected to the third internal electrode, and the first, second and third internal electrodes are spaced apart and insulated from each other.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the accompanying drawings, an X direction may refer to a first direction or a length direction, a Y direction may refer to a second direction or a width direction, and a Z direction may refer to a third direction, a thickness direction, or a stacking direction.

Figure 1:
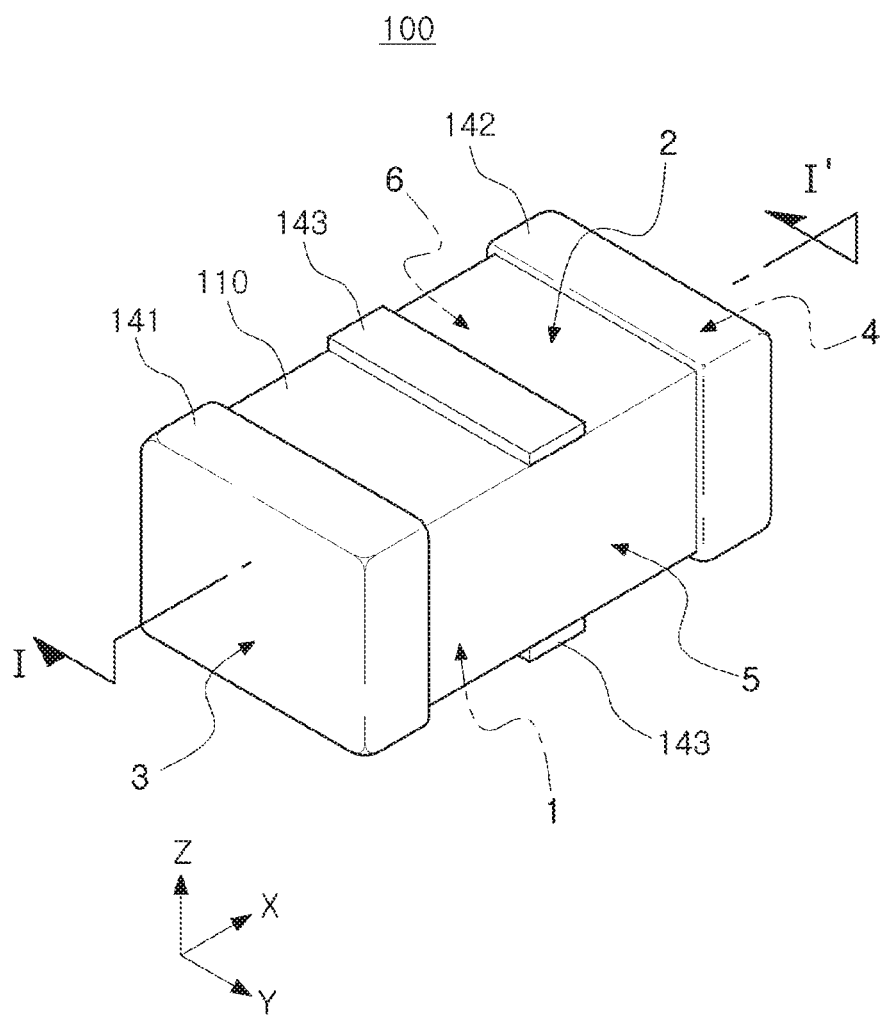
FIG. 1 is a perspective diagram schematically illustrating a multilayer capacitor according to an exemplary embodiment in the present disclosure.
Figure 2:
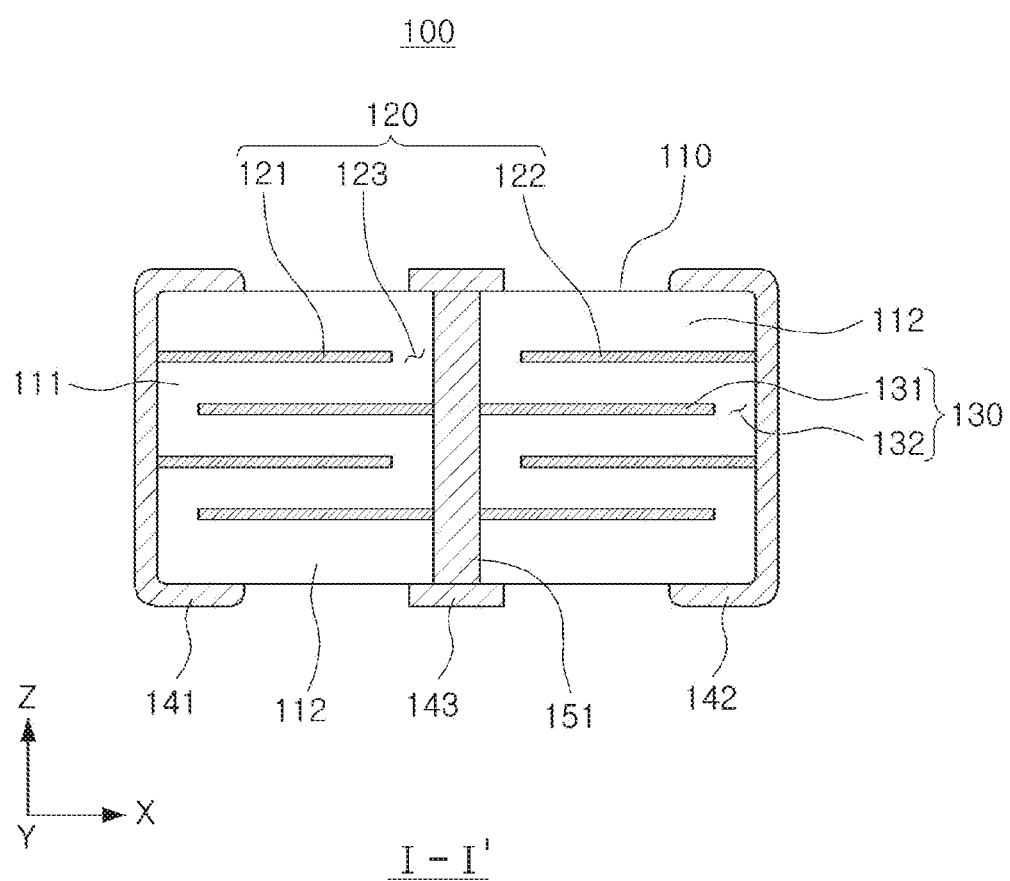
FIG. 2 is a cross-sectional diagram taken along line I-I' of FIG. 1.
Figure 3A:
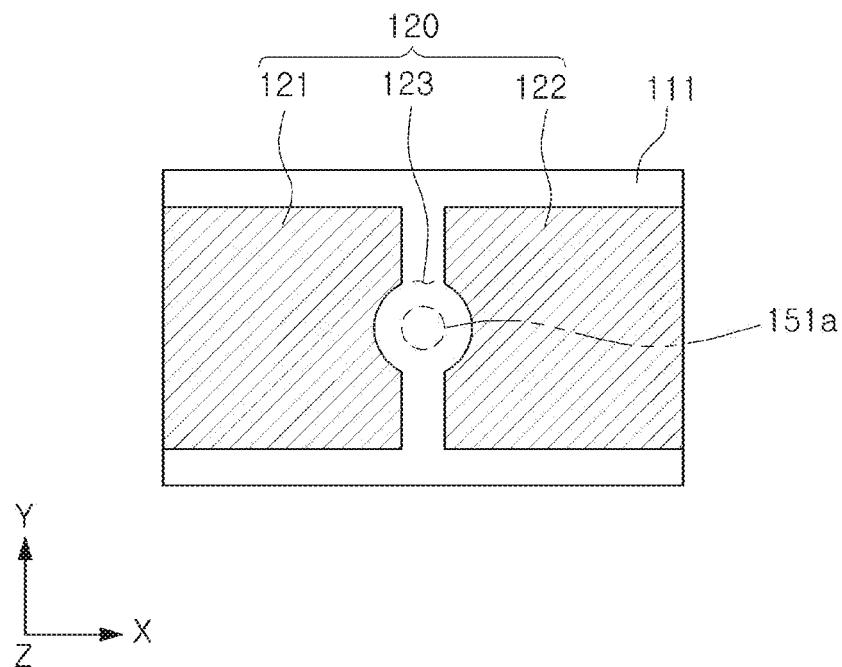
FIG. 3A is a diagram illustrating a ceramic sheet for forming a first internal electrode layer of FIG. 2.
Figure 3B:
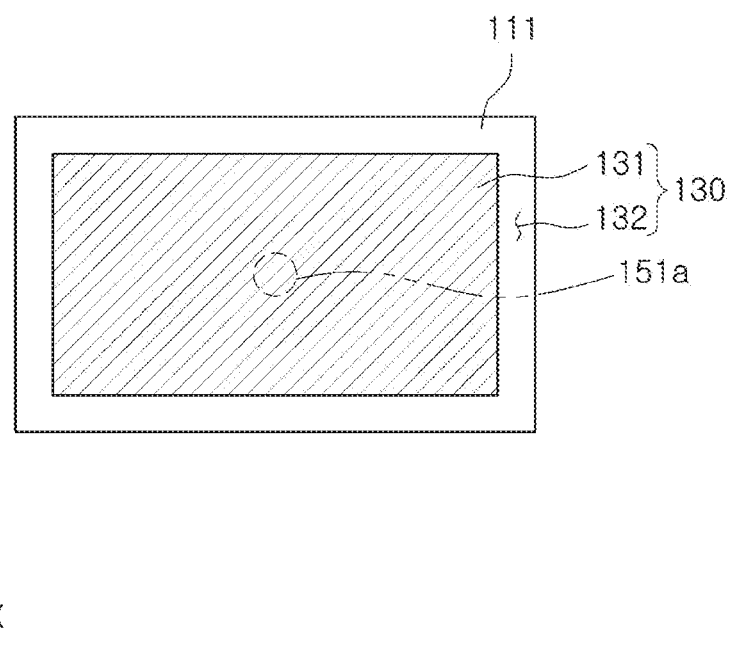
FIG. 3B is a diagram illustrating a ceramic sheet for forming a second internal electrode layer of FIG. 2.
Figure 3C:
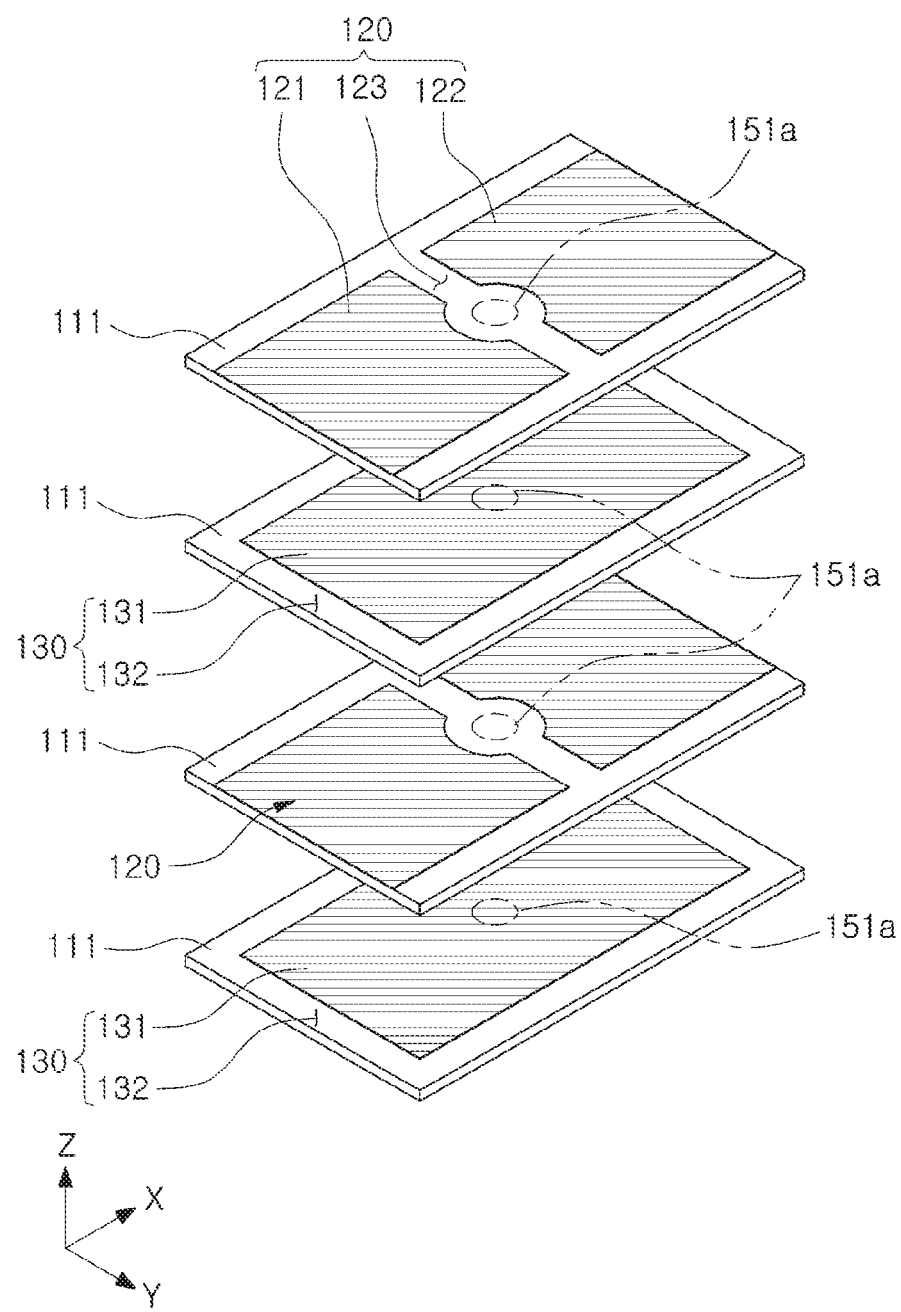
FIG. 3C is a diagram illustrating a stacking method for manufacturing the multilayer capacitor of FIG. 2.

FIG. 1 is a perspective diagram schematically illustrating a multilayer capacitor according to an exemplary embodiment in the present disclosure. FIG. 2 is a cross-sectional diagram taken along line I-I' of FIG. 1. FIG. 3A is a diagram illustrating a ceramic sheet for forming a first internal electrode layer of FIG. 2. FIG. 3B is a diagram illustrating a ceramic sheet for forming a second internal electrode layer of FIG. 2. FIG. 3C is a diagram illustrating a stacking method for manufacturing the multilayer capacitor of FIG. 2.

Referring to FIGS. 1 and 2, a multilayer capacitor 100 according to the exemplary embodiment in the present disclosure may include a body 110 and first to third external electrodes 141 to 143.

The body 110 may include an active region as a part contributing to forming capacitance of the capacitor and upper and lower covers 112 disposed on upper and lower surfaces of the active region as upper and lower margin parts.

According to the exemplary embodiment, a shape of the body 110 is not particularly limited, but may be substantially a hexahedral shape.

That is, the body 110 may not have a perfect hexahedral shape due to a difference in thickness depending on an arrangement of internal electrodes and polishing of edge portions, and may have a shape substantially close to a hexahedral shape.

Directions of a hexahedron will be defined in order to clearly describe exemplary embodiments of the present disclosure. Both surfaces of the body 110 opposing each other in the Z direction will be defined as first and second surfaces 1 and 2, both surfaces of the body 110 connected to the first and second surfaces 1 and 2 and opposing each other in the X direction will be defined as third and fourth surfaces 3 and 4, and both surfaces of the body 110 connected to the first and second surfaces 1 and 2 and the third and fourth surfaces 3 and 4 and opposing each other in the Y direction will be defined as fifth and sixth surfaces 5 and 6. Here, the first surface 1 may be a mounting surface.

Referring to FIG. 3C, the active region may have a structure in which a plurality of dielectric layers 111 and a plurality of first and second internal electrode layers 120 and 130 disposed with respective dielectric layers 111 interposed therebetween are alternately stacked.

The active region may include a first active region in which first and third internal electrodes 121 and 131 overlap each other to form capacitance and a second active region in which second and third internal electrodes 122 and 131 overlap each other to form capacitance. Therefore, the multilayer capacitor 100 may have the same effect as connecting two capacitors to each other, such that at the time of mounting the multilayer capacitor 100, a process may be simplified, and a mounting area may be decreased. Further, as described below, capacitance by the first active region and capacitance by the second active region may be differently designed, such that capacitors having various capacitances may be implemented.

The dielectric layer 111 may contain a ceramic powder having high permittivity, for example, a barium titanate ($BaTiO_3$) based powder or strontium titanate ($SrTiO_3$) based powder, or the like, but is not limited thereto.

Here, a thickness of the dielectric layer 111 may be optionally changed depending on a capacitance design of the multilayer capacitor 100. Considering of a size and capacitance of the body 110, a thickness of a single dielectric layer may be 0.1 to 10 μm after sintering, but is not limited thereto.

The first internal electrode layer 120 may include the first and second internal electrodes 121 and 122 spaced apart from each other with an insulating portion 123 interposed therebetween.

Referring to FIG. 3A, the first and second internal electrodes 121 and 122 may be formed by printing a conductive paste containing a conductive metal on the dielectric layer 111 at a predetermined thickness, the first internal electrode 121 may be formed to be exposed to the third surface 3 of the body 110, the second internal electrode 122 may be formed to be exposed to the fourth surface 4 of the body 110, and the first and second internal electrodes 121 and 122 may be insulated from each other by the insulating portion 123 interposed therebetween. That is, the first internal electrode 121 may be exposed to one of both surfaces of the body 110 in the length (X) direction, and the second internal electrode 122 may be exposed to the other surface of the body 110 opposing the surface thereof to which the first internal electrode 121 is exposed.

The first and second internal electrodes 121 and 122 as described above may be electrically connected to the first and second external electrodes 141 and 142 formed on the body, respectively.

The second internal electrode layer 130 may include the third internal electrode 131. The second internal electrode layer 130 may include a space 132 spaced apart from the third and fourth surfaces 3 and 4 of the body 110 so that the third internal electrode 131 may be insulated from the first and second external electrodes 141 and 142.

Referring to FIG. 3B, the third internal electrode 131 may be formed by printing a conductive paste containing a conductive metal on the dielectric layer 111 at a predetermined thickness, and be formed not to be exposed to the outside of the body 110. That is, the third internal electrode 131 may be formed to be spaced apart from the third to sixth surfaces of the body 110 by a predetermined distance.

The third internal electrode 131 may be electrically connected to the third external electrode 143 formed on the body 110 through a connection electrode 151.

A thickness of the first to third internal electrodes 121, 122, and 131 may be determined depending on the use thereof. For example, the thickness may be determined in a range of 0.2 to 1.0 μm in consideration of the size and capacitance of the body 110, but is not limited thereto.

Further, the conductive metal contained in the first to third internal electrodes 121, 122, and 131 may be nickel (Ni), copper (Cu), palladium (Pd), or an alloy thereof, but is not limited thereto.

The upper and lower covers 112 may have the same material and configuration as those of the dielectric layer 111 of the active region except that internal electrodes are not included therein.

That is, the upper and lower covers 112 may be formed by stacking a single or two or more dielectric layers on the upper and lower surfaces of the active region in the Z direction, respectively, and may basically serve to prevent the first to third internal electrodes 121, 122, and 131 from being damaged by physical or chemical stress.

The first and second external electrodes 141 and 142 may be disposed on the body 110 to be connected to the first and second internal electrodes 121 and 122, respectively. In a capacitor according to the related art, provided to decrease equivalent series inductance (ESL), first and second external electrodes are electrically connected to each other through internal electrodes, but in the multilayer capacitor according to the present disclosure, the first and second internal electrodes 121 and 122 are insulated from each other by the insulating portion 123. Therefore, the multilayer capacitor according to the present disclosure may be used in a state in which the first and second external electrodes 141 and 142 are not electrically connected to each other, such that the multilayer capacitor may be variously utilized.

The first and second external electrodes 141 and 142 may be disposed to face each other on both surfaces of the body 110 in the length (X) direction.

The connection electrode 151 may penetrate through the body 110 to thereby be connected to the third internal electrode 131.

Referring to a position 151a at which the connection electrode illustrated in FIGS. 3A through 3C will be formed, the connection electrode 151 may be formed to penetrate through the insulating portion 123 and the third internal electrode 131 and be spaced apart from the first and second internal electrodes 121 and 122.

Here, a plurality of connection electrodes 151 may be formed to penetrate through the body 110 in the thickness (Z) direction.

Further, although a case in which the connection electrode 151 has a circular shape is illustrated, the connection electrode 151 may have a shape such as a tetragon, a triangle, or the like, but the shape of the connection electrode 151 is not particularly limited.

Further, the connection electrode 151 may have a width within a range from 10 to 65% of a width of the body 110 in the width (Y) direction, but is not limited thereto.

The connection electrode 151 may be formed by forming a via in the body 110 and then filling the via with a conductive material. In order to form the via, a physical penetration method using a mechanical pin puncher, or the like, or a laser drill may be used. However, in a case in which a thickness of the body 110 is excessively thick, when the laser drill is used, peripheries of the via may be damaged and thus, connectivity of the electrode may be deteriorated. Therefore, it is preferable to use the physical penetration method.

The third external electrode 143 may be disposed on the body 110 to be connected to the connection electrode 151. The third external electrode 143 may be connected to the connection electrode 151 connected to the third internal electrode 131, such that the third external electrode 143 may be electrically connected to the third internal electrode 131.

The third external electrode 143 may be disposed on at least one of both surfaces of the body 110 in the thickness (Z) direction and may also be formed on both surfaces 1 and 2 of the body 110 as illustrated in FIG. 1.

Further, the third external electrode 143 may be formed to enclose the surfaces of the body 110 except for both surfaces of the body 110 in the length (X) direction and may be spaced apart from the first and second external electrodes 141 and 142.

Here, the first to third external electrodes 141 to 143 may be insulated from each other. However, it should be noted that this does not exclude a case in which the external electrodes are connected to each other when incorporated into a larger circuit.

With the capacitor according to the present disclosure, a capacitor having various capacitances may be implemented depending on what electrodes or terminals the first to third external electrodes are designed as.

Figure 12:
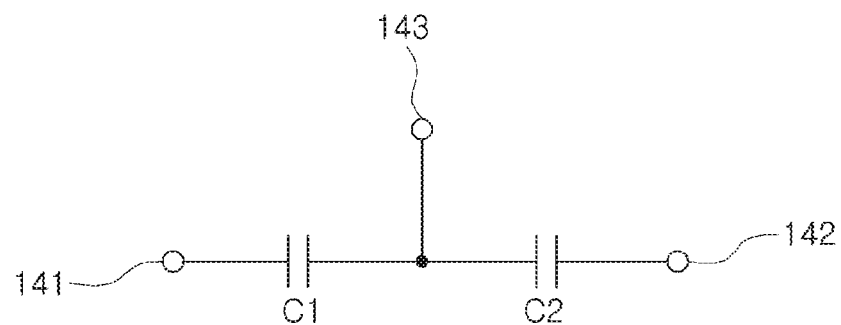
FIG. 12 is a basic circuit diagram of a capacitor according to an exemplary embodiment in the present disclosure.

FIG. 12 is a basic circuit diagram of a 3-terminal capacitor according to an exemplary embodiment in the present disclosure. As described above, the active region may include the first active region in which the first and third internal electrodes 121 and 131 overlap each other to form capacitance and the second active region in which the second and third internal electrodes 122 and 131 overlap each other to form capacitance, and the multilayer capacitor may have the same effect as connecting a capacitor having capacitance C1 formed by the first active region and a capacitor having capacitance C2 formed by the second active region to each other.

Referring to FIG. 12, the capacitor having the capacitance C1 may be implemented by floating the second external electrode 142 and setting the first external electrode 141 as an input terminal and the third external electrode 143 as an output terminal.

In a case of floating the first external electrode 141 and setting the second external electrode 142 as an input terminal and the third external electrode 143 as an output terminal, the capacitor having the capacitance C2 may be implemented.

Figure 13:
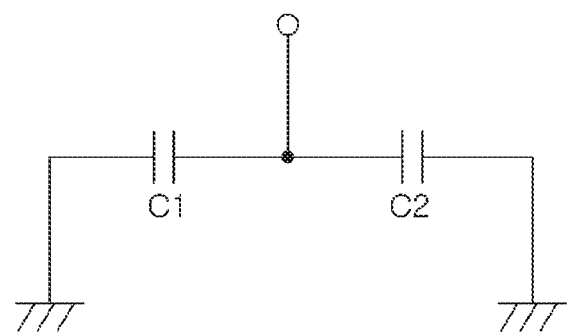
FIG. 13 illustrates a circuit configured to allow the multilayer capacitor according to the exemplary embodiment in the present disclosure to have the same effect as connecting two capacitors to each other in parallel.
Figure 14:
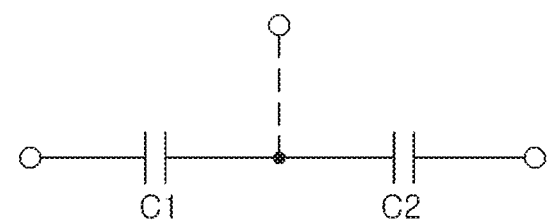
FIG. 14 illustrates a circuit configured to allow the multilayer capacitor according to the exemplary embodiment in the present disclosure to have the same effect as connecting two capacitors to each other in series.

FIG. 13 illustrates a circuit configured to allow the multilayer capacitor according to the exemplary embodiment in the present disclosure to have the same effect as connecting two capacitors to each other in parallel. FIG. 14 illustrates a circuit configured to allow the multilayer capacitor according to the exemplary embodiment in the present disclosure to have the same effect as connecting two capacitors to each other in series.

In a case of setting the first and second external electrodes 141 and 142 as ground (GND) terminals and the third external electrode 143 as a signal terminal as illustrated in FIG. 13, two capacitors having capacitances C1 and C2 may be connected to each other in parallel, such that a capacitor of which total capacitance is C1+C2 may be implemented.

In a case of floating the third external electrode and setting the first external electrode 141 as an input terminal and the second external electrode 142 as an output terminal as illustrated in FIG. 14, two capacitors having capacitances C1 and C2 may be connected to each other in series, such that a capacitor of which total capacitance is C1*C2/(C1+C2) may be implemented.

Further, the same effect as connecting two capacitors having different capacitances to each other may be secured according to various exemplary embodiments described below, and thus, a degree of freedom in design may be further improved.

Figure 4:
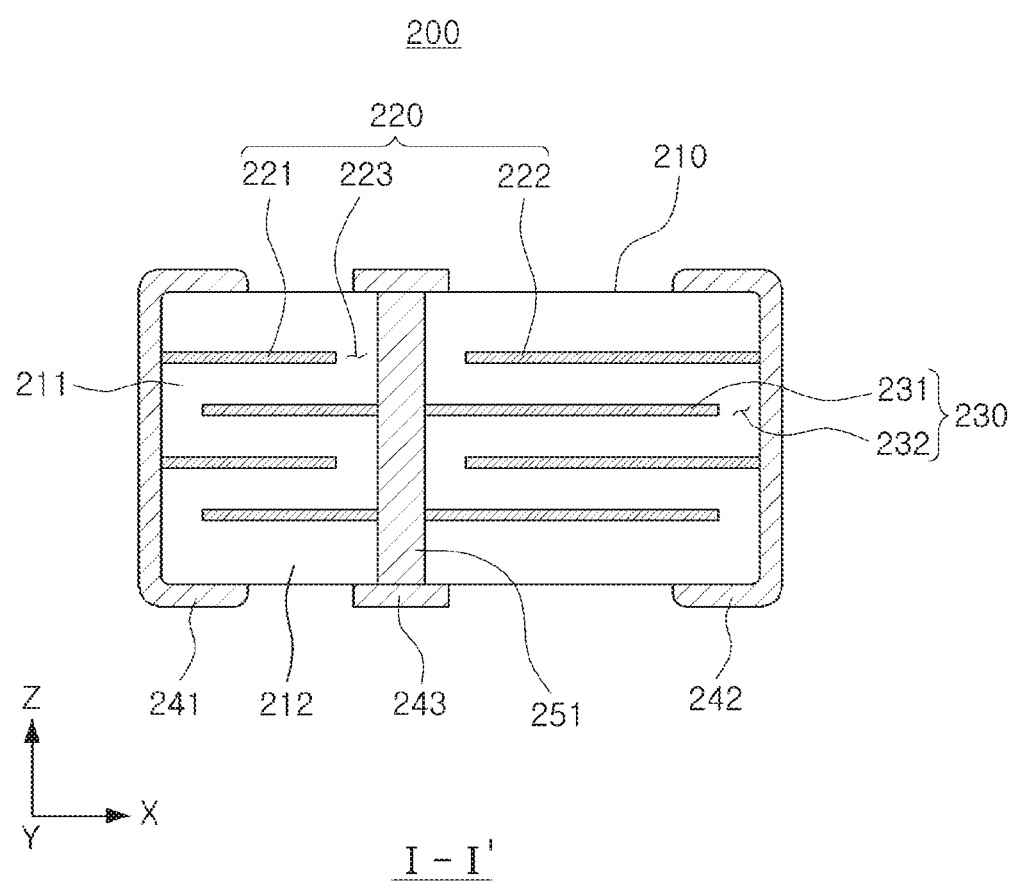
FIG. 4 is a cross-sectional diagram of a multilayer capacitor according to another exemplary embodiment in the present disclosure, taken along line I-I'.
Figure 5A:
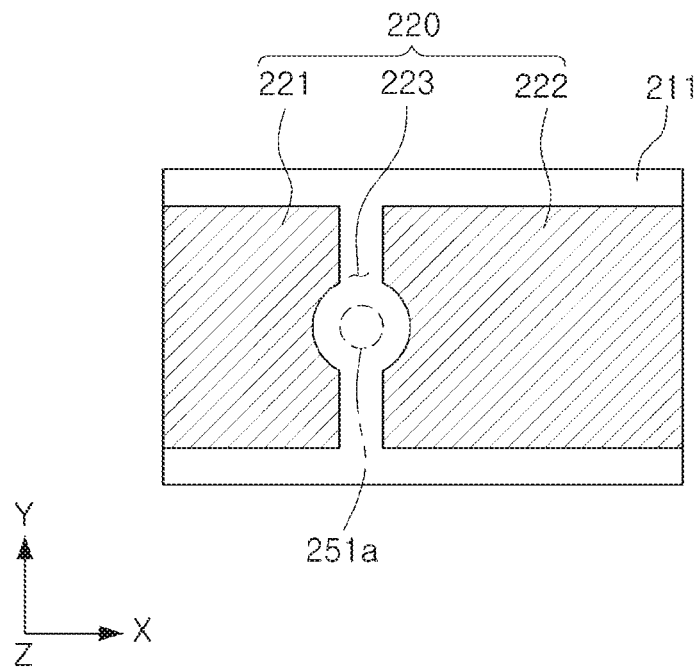
FIG. 5A is a diagram illustrating a ceramic sheet for forming a first internal electrode layer of FIG. 4.
Figure 5B:
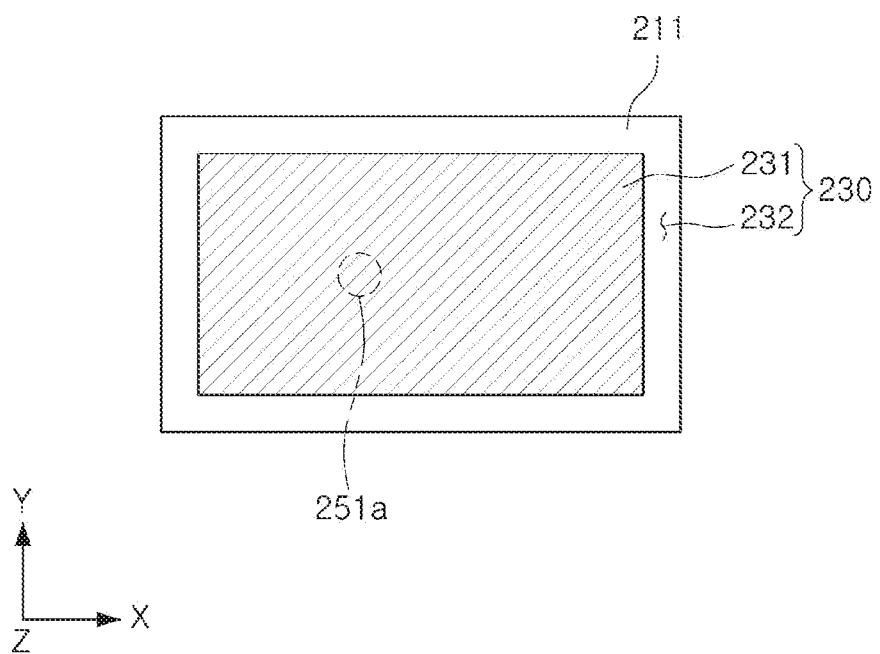
FIG. 5B is a diagram illustrating a ceramic sheet for forming a second internal electrode layer of FIG. 4.
Figure 5C:
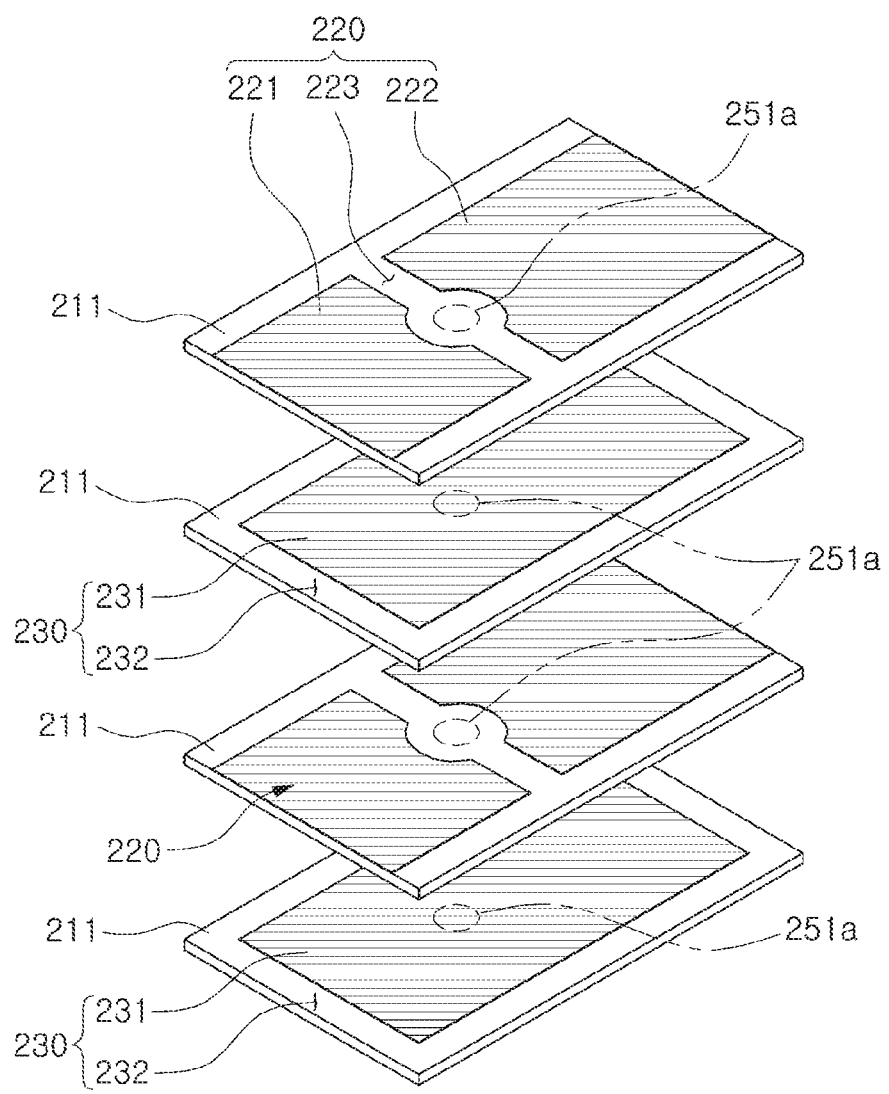
FIG. 5C is a diagram illustrating a stacking method for manufacturing the multilayer capacitor of FIG. 4.

FIG. 4 is a cross-sectional diagram of a multilayer capacitor 200 according to another exemplary embodiment in the present disclosure, taken along line I-I'. FIG. 5A is a diagram illustrating a ceramic sheet for forming a first internal electrode layer of FIG. 4. FIG. 5B is a diagram illustrating a ceramic sheet for forming a second internal electrode layer of FIG. 4. FIG. 5C is a diagram illustrating a stacking method for manufacturing the multilayer capacitor of FIG. 4.

Referring to FIGS. 4 through 5C, in the multilayer capacitor 200 according to another exemplary embodiment in the present disclosure, an area of an overlapping portion between first and third internal electrodes 221 and 231 may be different from an area of an overlapping portion between second and third internal electrodes 222 and 231.

The area of the overlapping portion between first and third internal electrodes 221 and 231 and the area of the overlapping portion between second and third internal electrodes 222 and 231 may be controlled depending on desired capacitance by allowing areas of the first and second internal electrodes 221 and 222 to be different from each other as illustrated in FIG. 5A, such that the multilayer capacitor 200 may have the same effect as connecting two capacitors having different capacitances to each other.

Referring to a position 251a at which a connection electrode illustrated in FIGS. 5A through 5C will be formed, a connection electrode 251 may be formed to penetrate through an insulating portion 223 and the third internal electrode 231 and be spaced apart from the first and second internal electrodes 221 and 222.

Further, since the areas of the first internal electrode 221 and the second internal electrode 222 are different from each other, the connection electrode 251 may be formed in a position biased toward a third or fourth surface 3 or 4 of a body. Therefore, the third external electrode 243 connected to the connection electrode 251 may also be formed in a position biased toward the third or fourth surface 3 or 4 of the body.

Figure 6:
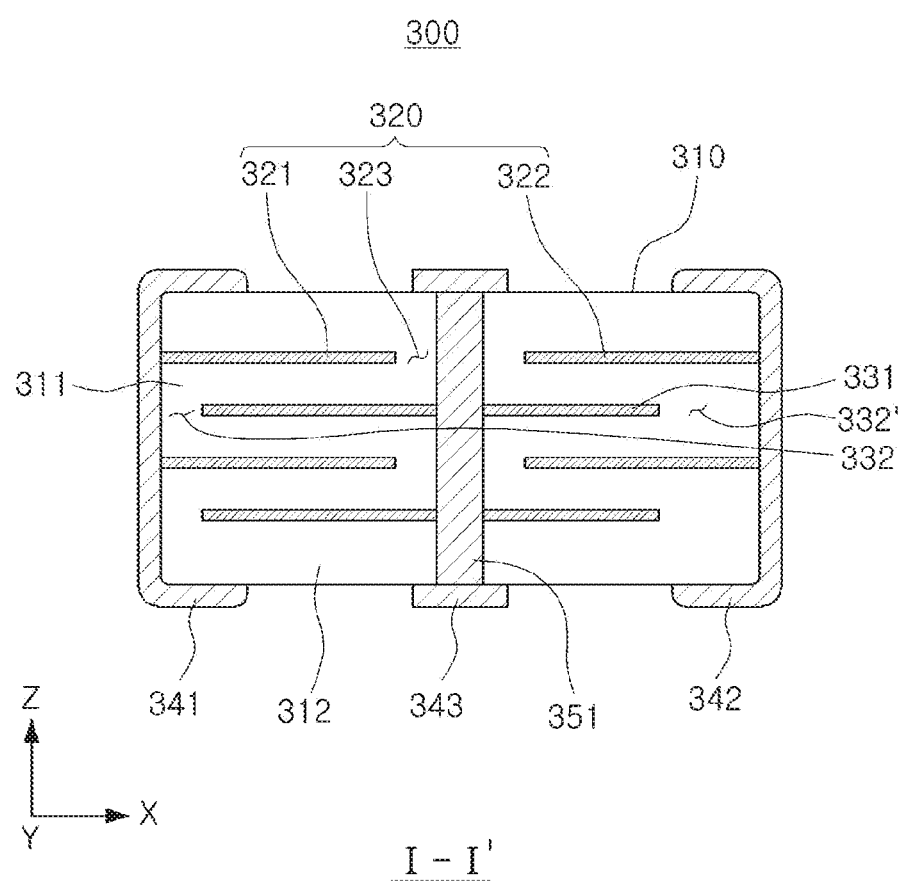
FIG. 6 is a cross-sectional diagram of a multilayer capacitor according to another exemplary embodiment in the present disclosure, taken along line I-I'.
Figure 7A:
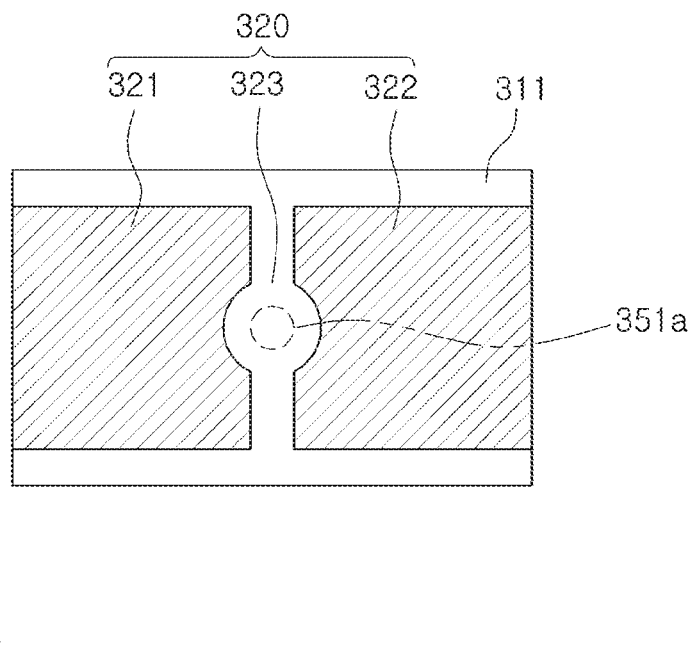
FIG. 7A is a diagram illustrating a ceramic sheet for forming a first internal electrode layer of FIG. 6.
Figure 7B:
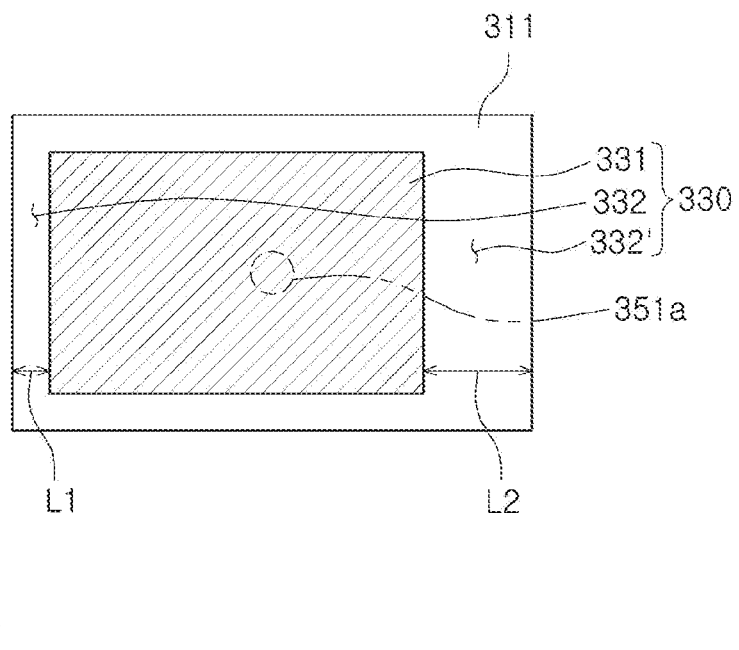
FIG. 7B is a diagram illustrating a ceramic sheet for forming a second internal electrode layer of FIG. 6.
Figure 7C:
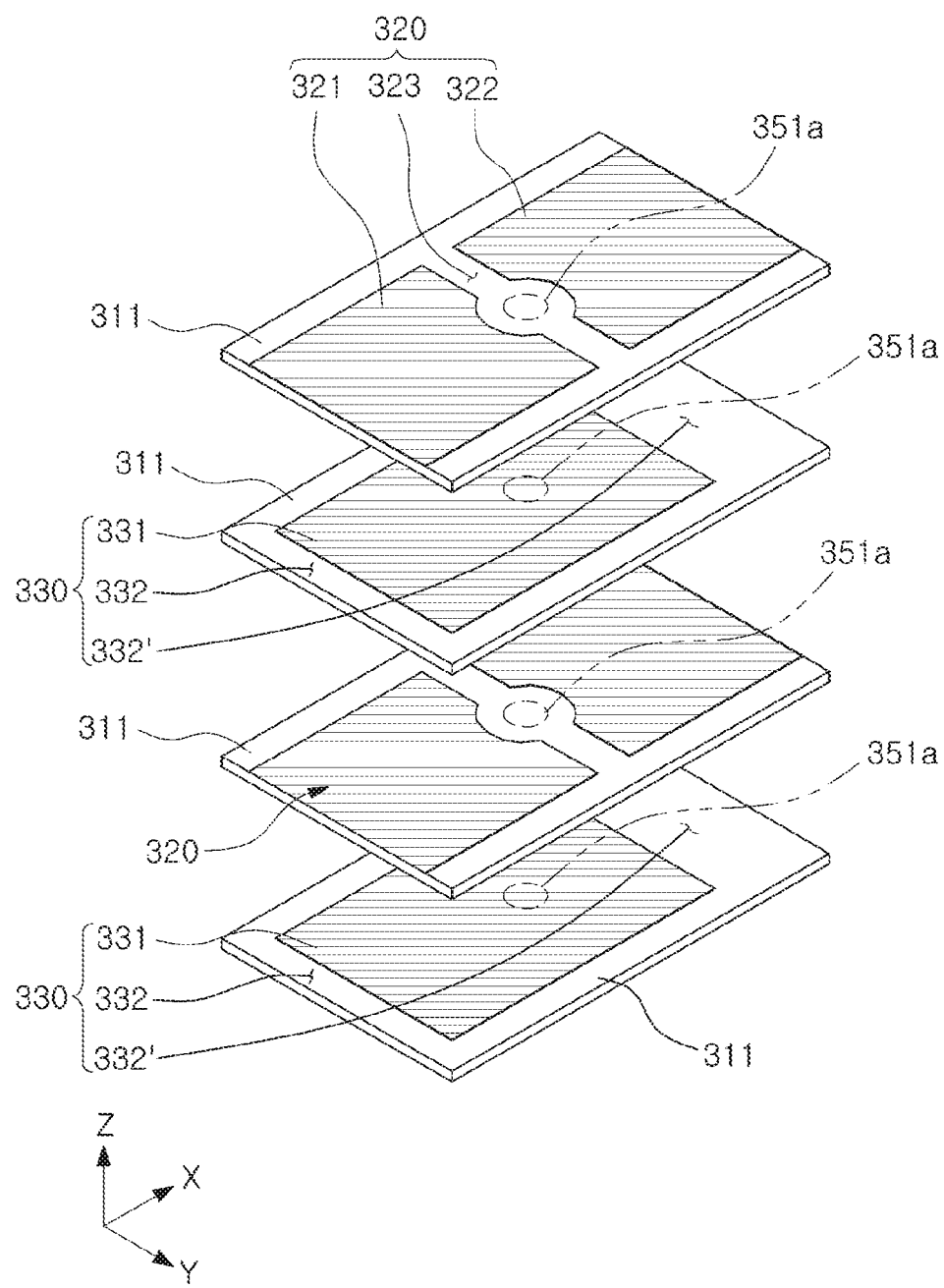
FIG. 7C is a diagram illustrating a stacking method for manufacturing the multilayer capacitor of FIG. 6.

FIG. 6 is a cross-sectional diagram of a multilayer capacitor 300 according to another exemplary embodiment in the present disclosure, taken along line I-I'. FIG. 7A is a diagram illustrating a ceramic sheet for forming a first internal electrode layer of FIG. 6. FIG. 7B is a diagram illustrating a ceramic sheet for forming a second internal electrode layer of FIG. 6. FIG. 7C is a diagram illustrating a stacking method for manufacturing the multilayer capacitor of FIG. 6.

Referring to FIGS. 6 through 7C, a spacing distance L1 between a third internal electrode 331 and a first external electrode 341 may be different from a spacing distance L2 between the third internal electrode 331 and a second external electrode 342.

That is, a second internal electrode layer 330 may include spaces 332 and 333 spaced apart from third and fourth surfaces of a body so that the third internal electrode 331 may be insulated from the first and second external electrodes 341 and 342, and sizes of the spaced spaces 332 and 333 may be different from each other.

Therefore, an area of an overlapping portion between first and third internal electrodes 321 and 331 and an area of an overlapping portion between second and third internal electrodes 322 and 331 may be controlled depending on the desired capacitance.

A multilayer capacitor 400 according to another exemplary embodiment in the present disclosure may include: a first internal electrode layer including first and second internal electrodes spaced apart from each other with an insulating portion interposed therebetween; a second internal electrode layer including a third internal electrode; a third internal electrode layer including a fourth internal electrode; a body including the first and third internal electrode layers alternately disposed with the second internal electrode layer interposed therebetween, and with respective dielectric layers interposed between each of the first, second and third internal electrode layers; a first external electrode disposed on the body to be connected to the first and fourth internal electrodes; a second external electrode disposed on the body to be connected to the second internal electrode; a connection electrode penetrating through the body to thereby be connected to the third internal electrode; and a third external electrode disposed on the body to be connected to the connection electrode, wherein the fourth internal electrode is stacked so that the fourth internal electrode partially overlaps the first and third internal electrodes but does not overlap the second internal electrode.

Figure 8:
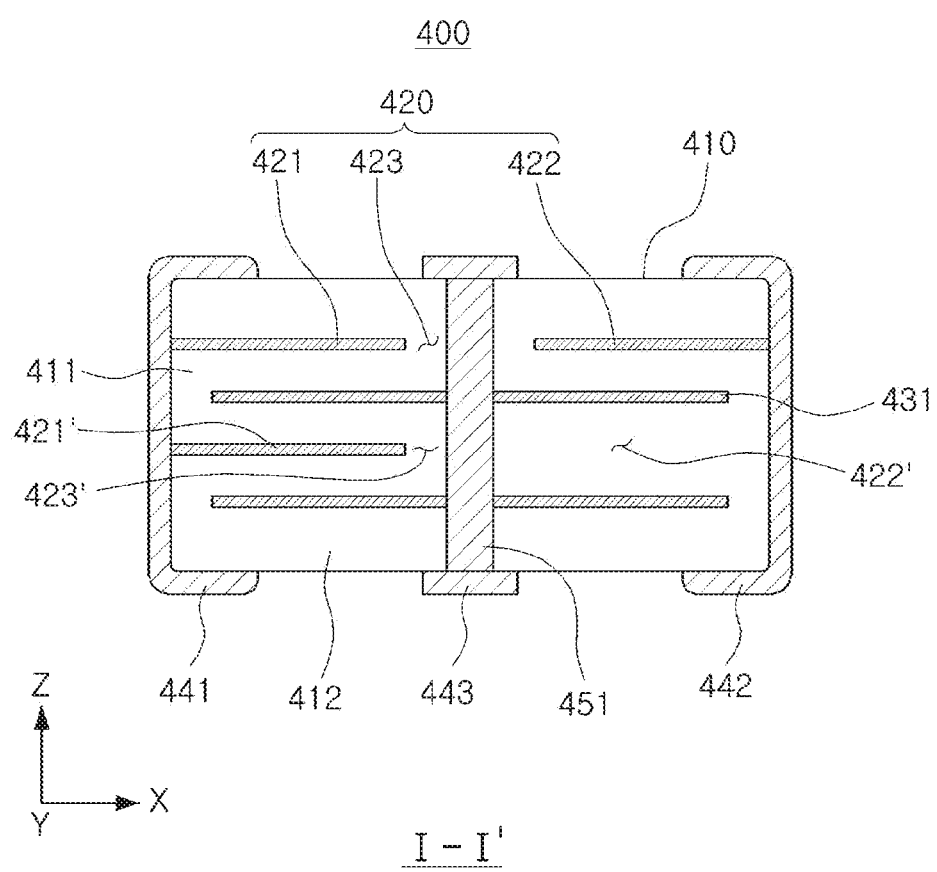
FIG. 8 is a cross-sectional diagram of a multilayer capacitor according to another exemplary embodiment in the present disclosure, taken along line I-I'.
Figure 9A:
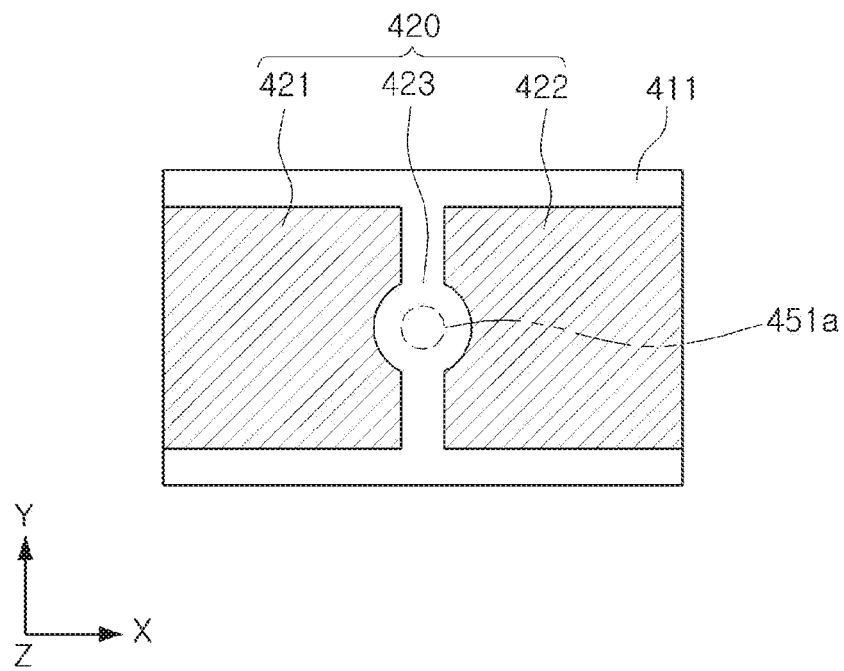
FIG. 9A is a diagram illustrating a ceramic sheet for forming a first internal electrode layer of FIG. 8.
Figure 9B:
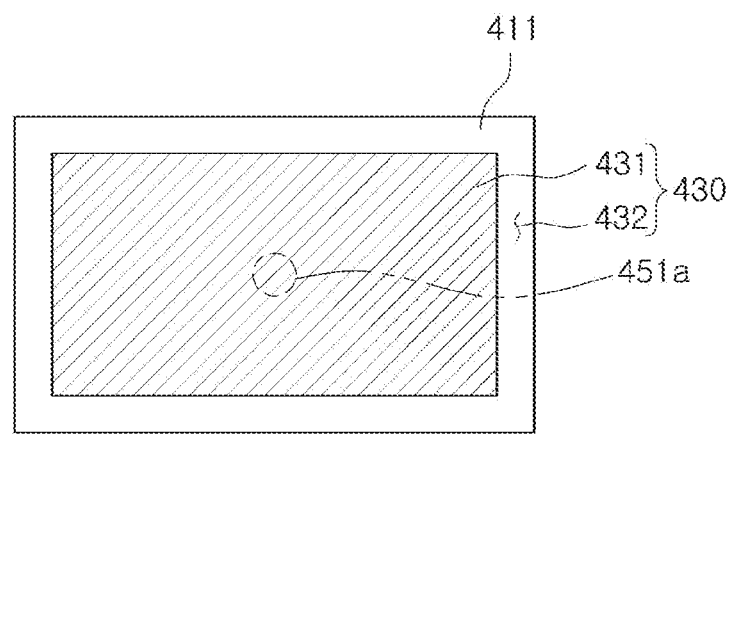
FIG. 9B is a diagram illustrating a ceramic sheet for forming a second internal electrode layer of FIG. 8.
Figure 9C:
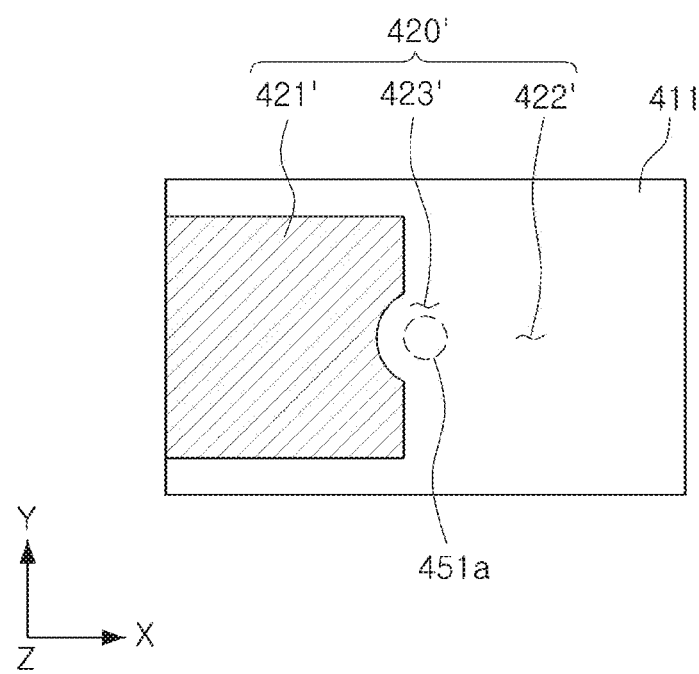
FIG. 9C is a diagram illustrating a ceramic sheet for forming a third internal electrode layer of FIG. 8.
Figure 9D:
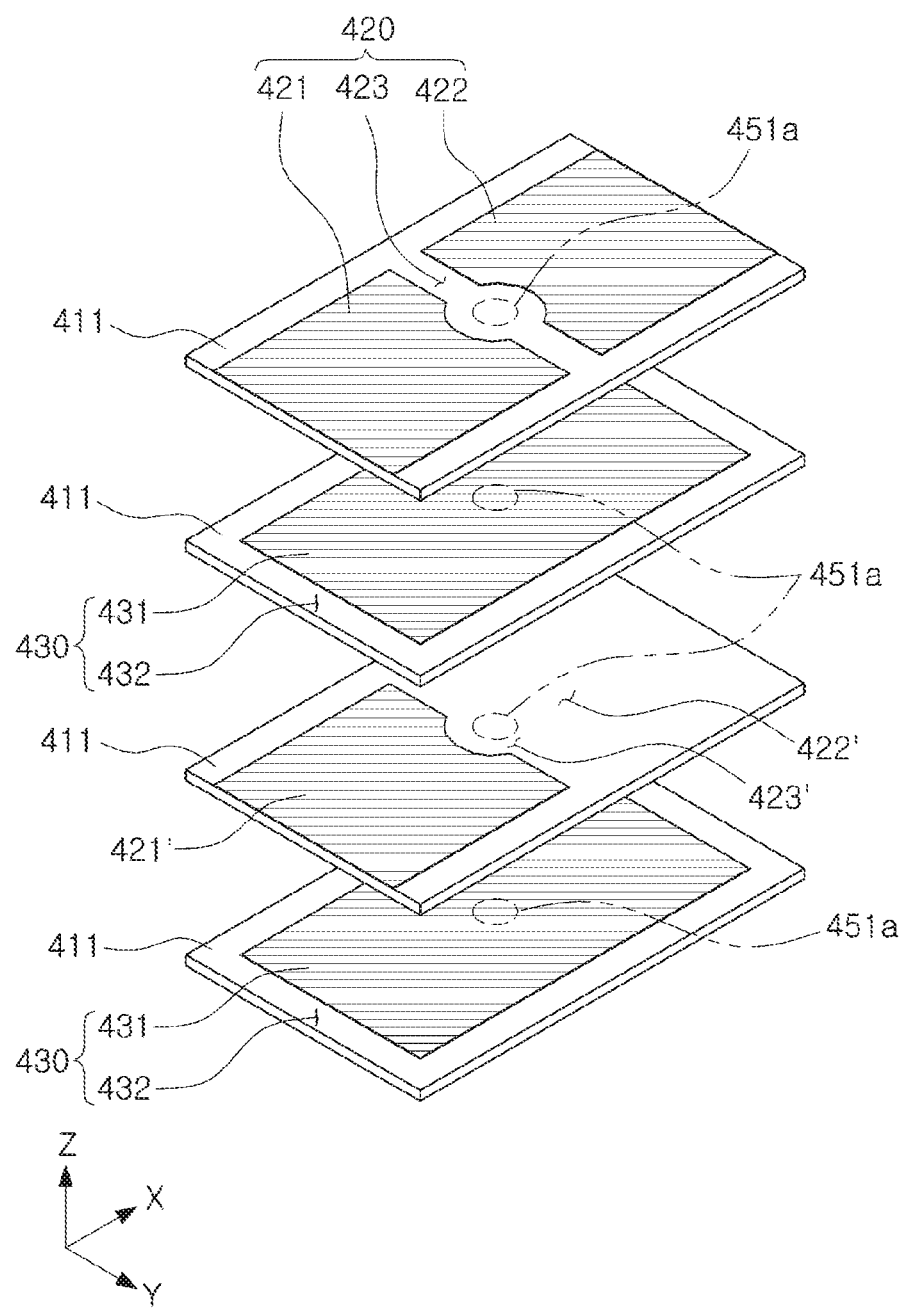
FIG. 9D is a diagram illustrating a stacking method for manufacturing the multilayer capacitor of FIG. 8.

FIG. 8 is a cross-sectional diagram of the multilayer capacitor 400 according to the present exemplary embodiment in the present disclosure, taken along line I-I'. FIG. 9A is a diagram illustrating a ceramic sheet for forming a first internal electrode layer of FIG. 8. FIG. 9B is a diagram illustrating a ceramic sheet for forming a second internal electrode layer of FIG. 8. FIG. 9C is a diagram illustrating a ceramic sheet for forming a third internal electrode layer of FIG. 8. FIG. 9D is a diagram illustrating a stacking method for manufacturing the multilayer capacitor of FIG. 8.

Referring to FIG. 8, a first external electrode 441 may be disposed to be connected to first and fourth internal electrodes 421 and 421', and a second external electrode 442 may be disposed to be connected to a second internal electrode 422.

A connection electrode 451 may penetrate through a body 410 to thereby be connected to a third internal electrode 431, and a third external electrode 443 may be disposed to be connected to the connection electrode 451, such that the third internal electrode 431 and the third external electrode 443 may be electrically connected to each other.

Referring to FIG. 9A, a first internal electrode layer 420 may include the first and second internal electrodes 421 and 422 spaced apart from each other with an insulating portion 423 interposed therebetween.

Referring to FIG. 9B, a second internal electrode layer 430 of the multilayer capacitor 400 according to the present exemplary embodiment in the present disclosure may have the same components as those of the second internal electrode layer 130 according to the exemplary embodiment in the present disclosure described above. Alternatively, the second internal electrode layer 430 may also have the same components as those of the second internal electrode layer 330 according to another exemplary embodiment in the present disclosure described above.

Referring to FIG. 9C, a third internal electrode layer 420' may include the fourth internal electrode 421'. The fourth internal electrode 421' may be stacked so that the fourth internal electrode 421' partially overlaps the first and third internal electrodes 421 and 431 but does not overlap the second internal electrode 422. That is, the third internal electrode 421' may have the same shape as that obtained by excluding the second internal electrode 422 from the first internal electrode layer 420. Therefore, the multilayer capacitor 400 may have the same effect as connecting two capacitors having different capacitances.

A multilayer capacitor 500 according to another exemplary embodiment in the present disclosure may include: a first internal electrode layer including first and second internal electrodes spaced apart from each other with a first insulating portion interposed therebetween; a second internal electrode layer including a third internal electrode; a third internal electrode layer including a dummy electrode and a fourth internal electrode spaced apart from each other with a second insulating portion interposed therebetween; a body including the first to third internal electrode layers alternately disposed with the second internal electrode layer interposed therebetween, and with respective dielectric layers interposed between each of the first, second and third internal electrode layers; a first external electrode disposed on the body to be connected to the first internal electrode; a second external electrode disposed on the body to be connected to the second and fourth internal electrodes; a connection electrode penetrating through the body to thereby be connected to the third internal electrode; and a third external electrode disposed on the body to be connected to the connection electrode, wherein the dummy electrode is insulated from the first, second and third external electrodes.

Figure 10:
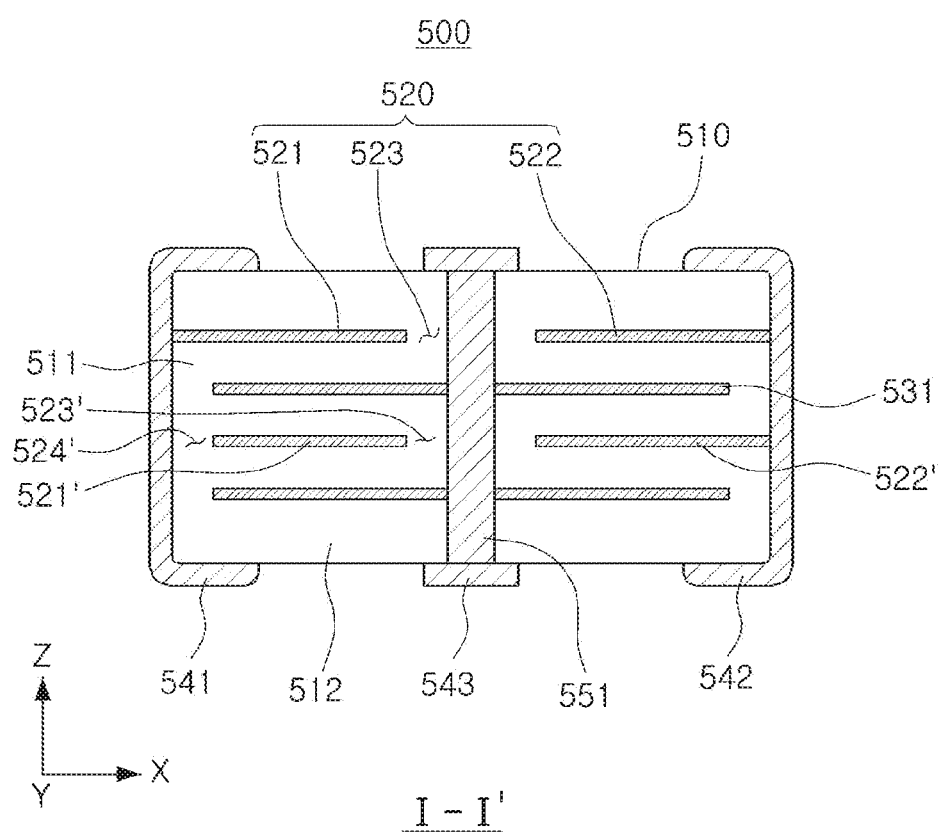
FIG. 10 is a cross-sectional diagram of a multilayer capacitor according to another exemplary embodiment in the present disclosure, taken along line I-I'.
Figure 11A:
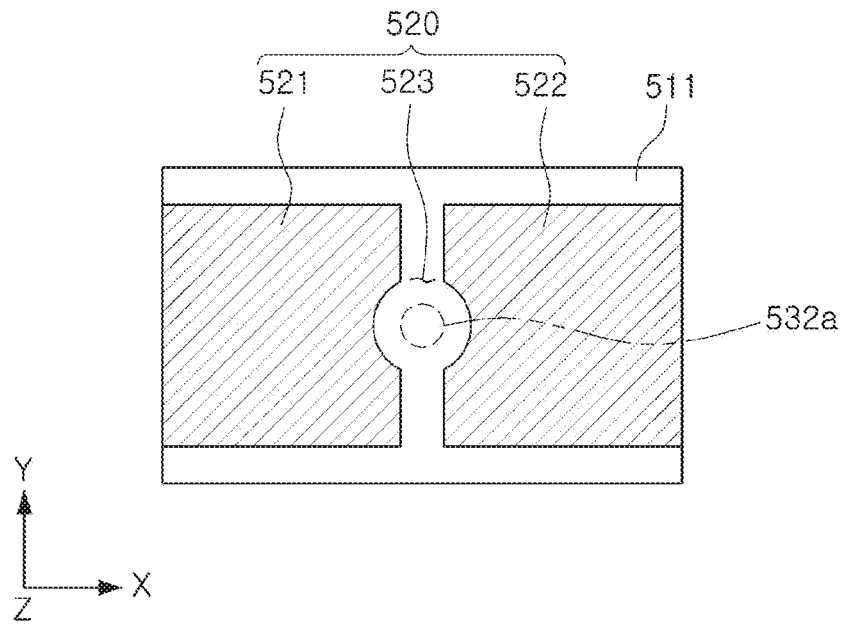
FIG. 11A is a diagram illustrating a ceramic sheet for forming a first internal electrode layer of FIG. 10.
Figure 11B:
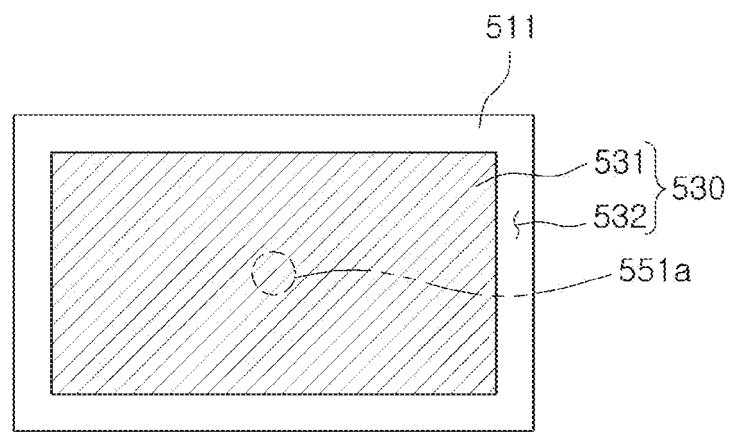
FIG. 11B is a diagram illustrating a ceramic sheet for forming a second internal electrode layer of FIG. 10.
Figure 11C:
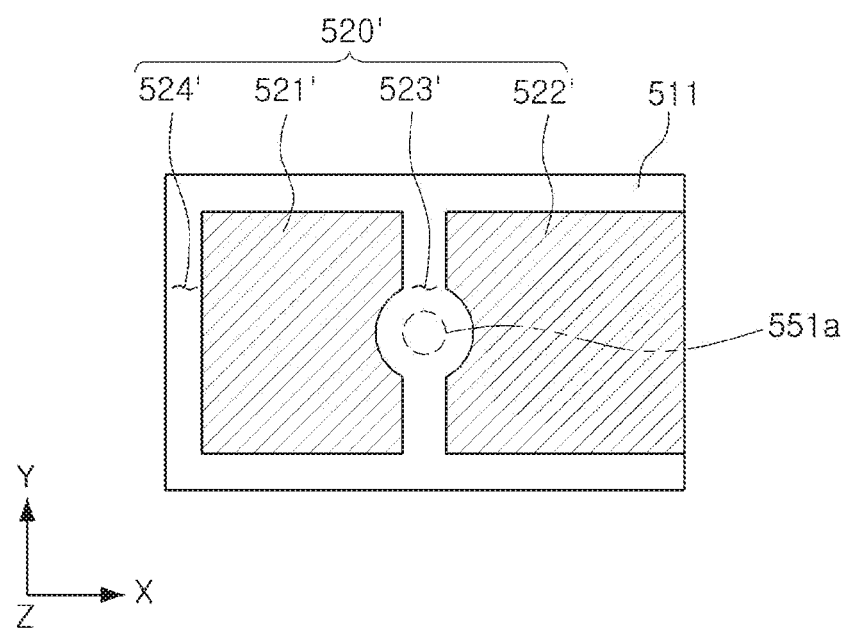
FIG. 11C is a diagram illustrating a ceramic sheet for forming a third internal electrode layer of FIG. 10.
Figure 11D:
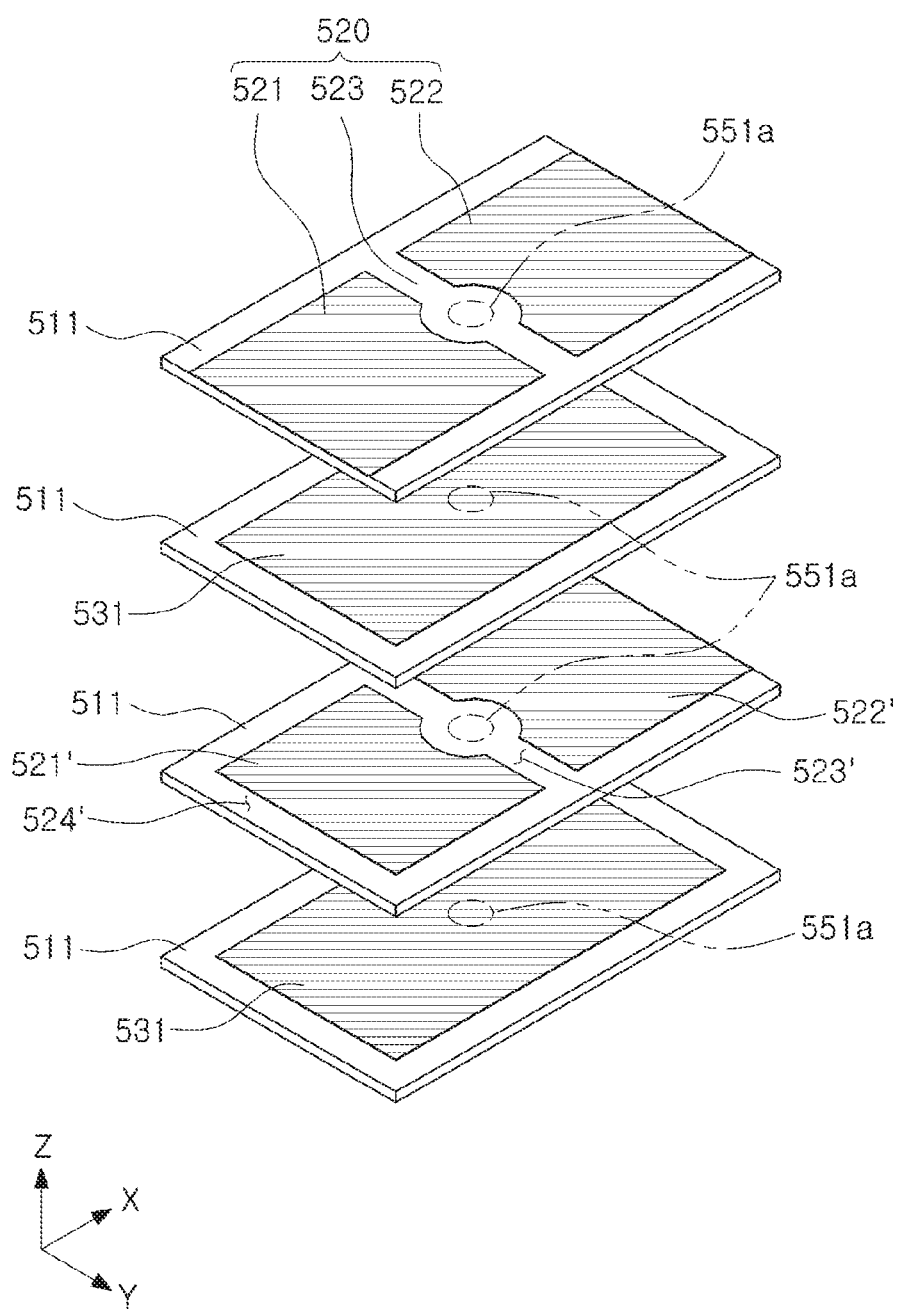
FIG. 11D is a diagram illustrating a stacking method for manufacturing the multilayer capacitor of FIG. 10.

FIG. 10 is a cross-sectional diagram of the multilayer capacitor 500 according to the present exemplary embodiment in the present disclosure, taken along line I-I'. FIG. 11A is a diagram illustrating a ceramic sheet for forming a first internal electrode layer of FIG. 10. FIG. 11B is a diagram illustrating a ceramic sheet for forming a second internal electrode layer of FIG. 10. FIG. 11C is a diagram illustrating a ceramic sheet for forming a third internal electrode layer of FIG. 10. FIG. 11D is a diagram illustrating a stacking method for manufacturing the multilayer capacitor of FIG. 10.

Referring to FIG. 10, a first external electrode 541 may be disposed to be connected to a first internal electrode 521, and a second external electrode 542 may be disposed to be connected to second and fourth internal electrodes 522 and 522'.

A connection electrode 551 may penetrate through a body 510 to thereby be connected to a third internal electrode 531, and a third external electrode 543 may be disposed to be connected to the connection electrode 551, such that the third internal electrode 531 and the third external electrode 543 may be electrically connected to each other.

Referring to FIG. 11A, the first internal electrode layer 520 may include the first and second internal electrodes 521 and 522 spaced apart from each other with a first insulating portion 523 interposed therebetween.

Referring to FIG. 11B, a second internal electrode layer 530 of the multilayer capacitor 500 according to the present exemplary embodiment in the present disclosure may have the same components as those of the second internal electrode layer 130 according to the exemplary embodiment in the present disclosure described above. Alternatively, the second internal electrode layer 530 may also have the same components as those of the second internal electrode layer 330 according to another exemplary embodiment in the present disclosure described above.

Referring to FIG. 11C, the third internal electrode layer 520' may include a dummy electrode 521' and a fourth internal electrode 522' spaced apart from each other with a second insulating portion 523' disposed therebetween. The dummy electrode 521' may be insulated from the first to third external electrodes 541 to 543. Since a space 524' spaced apart from the third surface is formed, unlike the first internal electrode 521 of the first internal electrode layer 520, the dummy electrode 521' may be insulated from the first external electrode 541.

Since the dummy electrode 521' is insulated from the first to third external electrodes 541 to 543, the dummy electrode 521' does not contribute to forming capacitance, such that the multilayer capacitor 500 according to another exemplary embodiment in the present disclosure may have the same effect as connecting two capacitors having different capacitances to each other.

Further, in a case of controlling capacitance by forming a region 422' in which the internal electrode is not formed as in the multilayer capacitor 400 according to another exemplary embodiment in the present disclosure, as the number of stacked internal electrode layers is increased, there is a risk that a stacking defect depending on the thickness of the internal electrode may occur. However, in a case of controlling capacitance by forming the dummy electrode 521', the stacking defect depending on the thickness of the internal electrode may be solved.

As set forth above, according to exemplary embodiments in the present disclosure, the multilayer capacitor having the same effect as connecting two capacitors may be provided, thereby solving a problem that as the capacitor becomes miniaturized, it is difficult to mount the capacitor. Further, the mounting area may be significantly decreased, and the number of mounting processes may be decreased.

In addition, the multilayer capacitor may have the same effect as connecting two capacitors having different capacitances to each other by controlling shapes and positions of the internal electrodes, and thus, a degree of freedom in design may be improved.

While exemplary embodiments have been shown and described above, it will be apparent to those skilled in the art that modifications and variations could be made without departing from the scope of the present invention as defined by the appended claims.

What is claimed is:

1. A multilayer capacitor comprising;
    a first internal electrode layer including first and second internal electrodes spaced apart from each other with an insulating portion interposed therebetween;
    a second internal electrode layer including a third internal electrode;
    a body including the first and second internal electrode layers alternately disposed with respective dielectric layers interposed therebetween;
    first and second external electrodes disposed on the body to be electrically connected to the first and second internal electrodes, respectively;
    a connection electrode penetrating through the body to thereby be electrically connected to the third internal electrode; and
    a third external electrode disposed on the body to be electrically connected to the connection electrode.

2. The multilayer capacitor of claim 1, wherein the first, second and third external electrodes are insulated from each other.

3. The multilayer capacitor of claim 1, wherein an area of an overlapping portion between the first and third internal electrodes is different from an area of an overlapping portion between the second and third internal electrodes.

4. The multilayer capacitor of claim 1, wherein an area of the first internal electrode is different from an area of the second internal electrode.

5. The multilayer capacitor of claim 1, wherein a spacing distance between the third internal electrode and the first external electrode is different from a spacing distance between the third internal electrode and the second external electrode.

6. The multilayer capacitor of claim 1, wherein the connection electrode penetrates through the insulating portion and the third internal electrode and is formed to be spaced apart from the first and second internal electrodes.

7. The multilayer capacitor of claim 1, wherein a plurality of connection electrodes are formed to penetrate through the body in a thickness direction.

8. The multilayer capacitor of claim 1, wherein the third external electrode is disposed on at least one of both surfaces of the body in a thickness direction.

9. The multilayer capacitor of claim 1, wherein the first and second external electrodes are disposed to face each other on opposite surfaces of the body in a length direction.

10. The multilayer capacitor of claim 9, wherein the third external electrode covers surfaces of the body except for both surfaces of the body in the length direction and is spaced apart from the first and second external electrodes.

11. The multilayer capacitor of claim 1, wherein the first and second internal electrodes are electrically insulated from each other by the insulating portion.

* * * * *